Figure 1:

(No Model.)

R. P. TRAXLER.
PAPER FILE.

No. 303,469. Patented Aug. 12, 1884.

Witnesses;
A. K. Mabie
Jno. L. Taggard

Inventor:
Robert P. Traxler
By his Atty;

UNITED STATES PATENT OFFICE.

ROBERT P. TRAXLER, OF SAN FRANCISCO, CALIFORNIA.

PAPER-FILE.

SPECIFICATION forming part of Letters Patent No. 303,469, dated August 12, 1884.

Application filed November 5, 1883. (No model.)

*To all whom it may concern:*

Be it known that I, ROBERT P. TRAXLER, a citizen of the United States, residing in the city and county of San Francisco, State of California, have made and invented certain new and useful Improvements in Paper-Files; and I do hereby declare that the following is a full, clear, and exact description of my said invention, reference being had to the accompanying drawings.

My invention relates to an improved file and holder for newspapers, periodicals, pamphlets, letters, and other matter required to be filed for ready reference. The object sought to be attained is to produce a simple, cheap, and effective file and holder for the purpose.

It consists, essentially, in the novel construction and application of a spring-clasp by which a strong fastening is produced to confine two clamps or stickes together, the clasp being of such character that it permits the sticks to spread apart as the thickness of matter between them increases by additions thereto; and it also operates as a secure fastening or lock.

The following description fully explains the manner in which I proceed to construct, apply, and use my said invention, the drawing being referred to by figures and letters.

Figure 2:
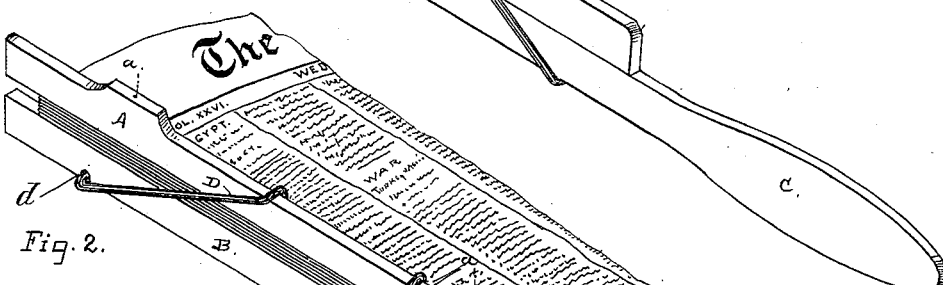
Figure 3:
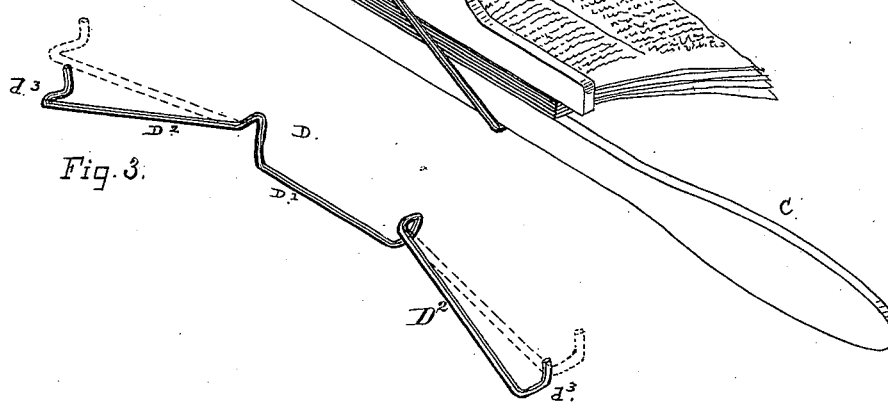
Figure 4:
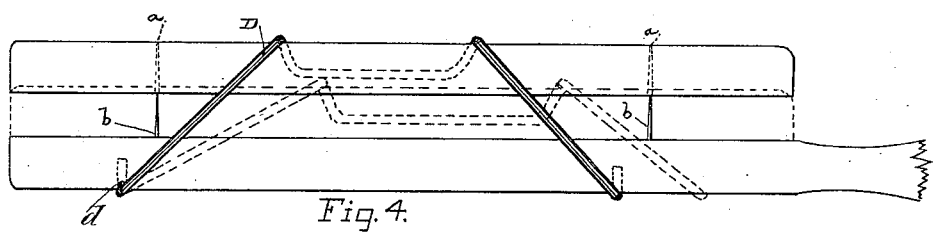

Figure 1 of the drawings represents a perspective view of the file or holder. Fig. 2 is a similar view showing papers clasped therein. Fig. 3 is a view of the wire spring detached. Fig. 4 is a side elevation showing the retaining-pins on one stick and the openings to receive them in the other.

I provide two clamp-sticks, as A B, in the edge of one of which I fix two or more pins or impaling-points, $b\ b$, and in the edge of the opposite stick a corresponding number of slots or grooves, $a$, to receive these points, so that when brought together the points are covered by the other stick. That portion of the body of the stick between the slots $a$ may be cut away, if desired, to lighten the stick, but of course sufficient material should be left around the holes $a$. This reduction of weight is of advantage more particularly in heavy files. A suitable handle, C, is provided on the end of one of the sticks, and a loop or means for hanging the file may be fixed to the other end.

From a single piece or length of stiff wire having requisite elastic quality I produce a clasp, D, of substantially the form shown in Fig. 3. A central loop or catch, D', is bent up in the middle of the length of wire, and the outer portions, $D^2\ D^2$, are then bent to stand out in opposite directions, but in the same plane. Upon the ends $d^3\ d^3$ are formed hooks or catches at right angles with the wires. The center loop, D', is bent upon itself at right angles, so that it lies then practically parallel with the wires $D^2$. This loop takes over the edge of the stick A, for which purpose its shape will conform to the thickness of the stick at the point over which it is set.

In applying this clasp the center catch fits over the back of the stick and the opposite stick being placed in position against the other edge of this stick, the bent ends of the wires $D^2$ are sprung over upon the outside edge of this latter stick. One of these bent ends may be set in a groove or notch, $d$, on the edge of the stick B; but the other bent ends should be left free to ride over this edge. The two parts of the file are then held together with a strong pressure, and are also firmly locked or fastened without catches or devices of any kind. They also readily yield and adjust themselves to the increase of matter as it is added to the file. One of these spring-clasps is sufficient for sticks of ordinary size; but for large heavy newspaper and periodical files two or more may be applied at regular distances apart along the sticks. A double spring-clasp could be produced from a single length of wire that would then be simply two smaller clasps joined together at the adjacent ends of the wires $D^2\ D^2$. Such clasps would then have two loops, D' D', a single loop or bend in the center to embrace the edge of the stick opposite to the clasps $D^2$, and two outer end catches, $d^3\ d^3$. No particular advantage would be gained by such construction, however, excepting that the two clasps for a long stick would be permanently attached or connected together to prevent loss of the parts through carelessness.

Having thus fully described my invention, what I claim, and desire to secure by Letters Patent, is—

1. The combination of the stick or part A and stick or part B with the spring-wire clasp D, bent substantially as described, to catch upon both sticks and hold them together.

2. The combination, with the sticks or parts A B of a paper-file, of the wire clasp and fastening D, having the loop or part D', adapted to engage with one stick or part, and the ends $d^3$, to take over and engage with the edge of the other stick or part, substantially as set forth.

3. The combination of the stick A, having the openings $a$ $a$, and stick B, having the pins $b$ $b$, adapted to enter the openings $a$ $a$, and provided with the notch $d$ on the opposite edge, with the wire clamp D, having the central part, D', adapted to engage one stick, and the hooks $d^3$ on the ends engaging stick B, and one of which enters the notch $d$, as set forth.

ROBERT P. TRAXLER. [L. S.]

Witnesses:
EDWARD E. OSBORN,
JNO. L. TAGGARD.